US008297924B2

(12) United States Patent
Mori et al.

(10) Patent No.: US 8,297,924 B2
(45) Date of Patent: Oct. 30, 2012

(54) ACTUATION SYSTEM, HELICOPTER USING THE SAME, AND CONTROLLING METHOD THEREFOR

(75) Inventors: Shigeyuki Mori, Aichi-ken (JP); Hiroshi Saito, Aichi-ken (JP); Shuichi Nakayama, Aichi-ken (JP); Kunimitsu Shimoyama, Aichi-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 1191 days.

(21) Appl. No.: 12/153,889

(22) Filed: May 27, 2008

(65) Prior Publication Data
US 2008/0304967 A1 Dec. 11, 2008

(30) Foreign Application Priority Data

Jun. 11, 2007 (JP) .................................. 2007-153886

(51) Int. Cl.
*B64C 27/16* (2006.01)
(52) U.S. Cl. ................ 416/24; 416/156; 416/1; 60/473; 60/476; 91/420; 91/421
(58) Field of Classification Search ............... 415/211.2, 415/148, 118; 416/24, 23, 1, 156, 162; 60/473, 60/476; 91/421, 420
See application file for complete search history.

(56) References Cited

U.S. PATENT DOCUMENTS

| | | | | |
|---|---|---|---|---|
| 3,420,265 A | * | 1/1969 | De Pauw | 137/501 |
| 4,669,266 A | * | 6/1987 | Kubik | 60/422 |
| 5,639,215 A | * | 6/1997 | Yamakawa et al. | 416/23 |
| 6,625,982 B2 | * | 9/2003 | Van Den Bossche et al. | 60/403 |
| 6,886,331 B2 | * | 5/2005 | Joshi | 60/473 |
| 7,172,257 B2 | * | 2/2007 | Tamaru et al. | 305/145 |

FOREIGN PATENT DOCUMENTS

| | | |
|---|---|---|
| JP | 2002-089453 | 3/2002 |
| JP | 2002-234499 | 8/2002 |
| JP | 2003-530267 | 10/2003 |
| JP | 2004-066990 | 3/2004 |
| JP | 2005-299818 | 10/2005 |

OTHER PUBLICATIONS

Japanese Office Action mailed Jun. 1, 2009 for Japanese Patent Application No. 2007-153886 w/partial translation.

* cited by examiner

*Primary Examiner* — Ninh H Nguyen
(74) *Attorney, Agent, or Firm* — Wenderoth, Lind & Ponack, L.L.P.

(57) ABSTRACT

An actuation system includes a pump assembly configured to form a pump chamber, an actuator having first and second chambers and a movable member and configured to convert pressures applied to the first and second chambers into a movement of the movable member, and a valve section. The valve section has a plurality of positions set by a controller, and the plurality of positions includes a first position in which the valve section opens the first flow path and closes the second flow path, a second position in which the valve section closes the first flow path and opens the second flow path, and a neutral position in which the valve section closes the first and second flow paths.

19 Claims, 12 Drawing Sheets

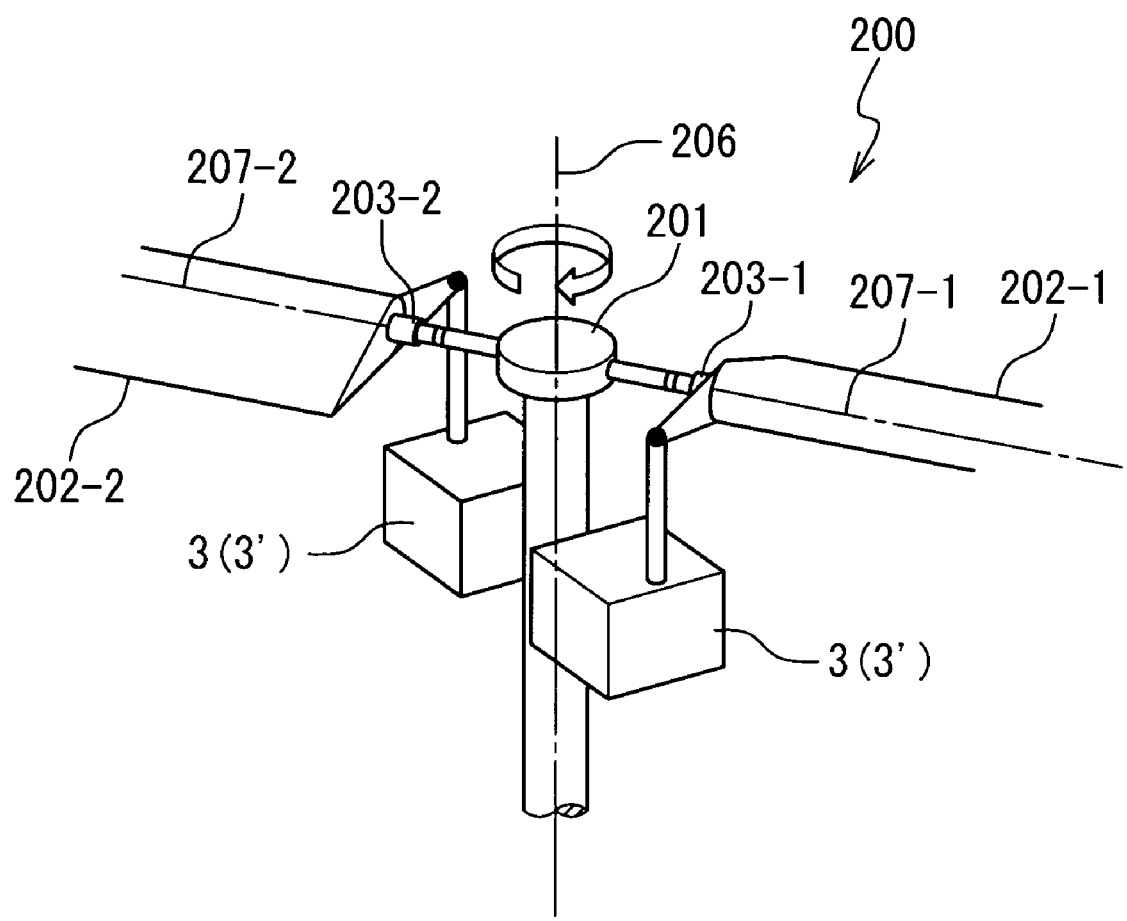

ACTUATION SYSTEM, HELICOPTER USING THE SAME, AND CONTROLLING METHOD THEREFOR

INCORPORATION BY REFERENCE

This Patent Application is based on Japanese Patent Application No. 2007-153886. The disclosure thereof is incorporated herein by reference.

BACKGROUND OF THE INVENTION

1. Field of the Invention

The present invention relates to an actuation system and a helicopter.

2. Description of Related Art

A helicopter has a rotary wing on an airframe thereof and is possible to perform vertical ascent and decent, forward and backward movement, and hovering. The helicopter is desired to have an improved operability. FIG. 1 shows a rotary wing of a convention helicopter. The rotary wing 100 includes a rotor 101, blades 102-1 and 102-2, bearings 103-1 and 103-2, a swash plate 104, and a pitch change 105. The rotor 101 is arranged in an upper portion of the airframe of the helicopter (not shown) and rotates around a rotation axis 106 with respect to the airframe. The blades 102-$i$ ($i$=1, 2) form a wing. The bearings 103-$i$ are supported by the rotor 101 and support blades 102-$i$ rotatably around rotation axes 107-$i$. The swash plate 104 is supported by the rotor 101 to be movable in up and down directions along the rotation axis 106. The pitch change 105 is connected to a part of the blade 102-$i$ and a part of the swash plate 104 and maintains a distance between the part of the blades 102-$i$ and the part of the swash plate 104 to be a constant.

The blades 102-$i$ generate a lift force when the rotor 101 rotates. That is to say, the rotary wing 100 generates propulsion of the helicopter through rotation of the rotor 101. In this case, the swash plate 104 can be moved in the direction 108 to change the lift force of the blades 102-$i$, thereby improving the operability of the helicopter. For the helicopter, it is desired to reduce vibrations and noises more.

It is known that the helicopter can reduce vibrations and noises more by driving a flap to deform an airfoil of the blades. FIG. 2 shows a driving unit 110 for driving a flap. The driving unit 110 includes a hydraulic source 111, a hydraulic pipe 112, and a hydraulic cylinder 113. The hydraulic source 111 is arranged on the airframe of the helicopter and pressurizes hydraulic fluid to generate a predetermined hydraulic pressure. The hydraulic pipe 112 transmits the hydraulic pressure from the hydraulic source 111 to the hydraulic cylinder 113 by passing the hydraulic fluid. The hydraulic cylinder 113 drives the flap 114 with the hydraulic pressure of the hydraulic fluid. In this case, in order to transmit the hydraulic pressure from the airframe to the rotating blade, a complex mechanism is required. The driving unit 110 is desired to have more simple structure and to be arranged inside the blade.

FIG. 3 shows a driving unit 120 arranged inside the blade. The driving unit 120 is composed of a so-called bimorph type piezoactuator 121 made by laminating piezoelectric elements which are deformed based on applied voltage. The driving unit 120 is deformed into a form depending on a voltage applied to each of the piezoelectric elements so that a flap 122 is driven to a position. The driving unit 120 is desired to have a larger stroke (movable range).

One conventionally known driving unit uses a laminate type piezoactuator to enlarge the movable range by applying leverage. Such a driving unit has a small driving force compared with a bimorph type piezoactuator for which the leverage is not applied and may have a large error because of a mechanical fluctuation of the leverage. The driving unit is desired to have a strong output force and have higher precision.

Japanese Laid Open Patent Application (JP-P2004-66990A) discloses a flap driving unit suitable for a unit for driving flaps provided for rotor blades. In the flap driving unit in the rotor blades, each of first and second actuator units is arranged on the rotor blade along a direction of the length of the rotor blade and has an actuator for generating a driving force the stretching and shortening. A first rotation section is provided between the first actuator unit and the second actuator unit and rotates the flaps into one direction in response to the driving force of the first actuator unit. A second rotation section is provided between the first actuator unit and the second actuator unit and rotates the flaps in another direction in response to the driving force of the second actuator unit.

Japanese Laid Open Patent Application (JP-P2003-530267A) discloses a piezoelectric control apparatus for controlling flaps of a rotor blade of a helicopter, which has functionality in high level and certainty of the operation. The piezoelectric control apparatus has a piezoelectric element device including at least a laminated piezoelectric actuator and a force transmission frame connected to the piezoelectric element device. The force transmission frame is fixed on the rotor blade and generates force acting between a support member provided for the force transmission frame and a driven element in an orthogonal direction to a direction of centrifugal force of the rotor blade based on a change in the length of the piezoelectric element device when the piezoelectric element device is excited. In the piezoelectric control apparatus, a first holder allows a relative movement to the rotor blade of the force transmission frame in the orthogonal direction to the direction of centrifugal force within a limited range, and is bendable in the orthogonal direction to the direction of centrifugal force although fixing the force transmission frame on the rotor blade in the direction of centrifugal force. A second holder is bendable in the direction of centrifugal force although relatively fixing the support member provided for the force transmission frame on the rotor blade in the direction orthogonal to the direction of centrifugal force and allows a relative movement of the support member to the rotor blade of the force transmission frame in the direction of centrifugal force within a limited range.

Japanese Laid Open Patent Application (JP-P2002-234499A) discloses a flap structure with a flap driving section into a rotor blade, which can adjust and maintain a flap function through inspection without substantially influencing the rotor blade. The rotor blade includes a flap and a flap driving section. A flap is provided outside the blade and the flap driving section is provided inside the blade. In the lift force generating blade, a blade chamber having an opening portion in a direction of a posterior edge of a wing is formed, and at least one casing is inserted from the opening portion and fixed to the inside of a blade chamber, and the casing incorporates at least one flap driving part and a flap.

Japanese Laid Open Patent Application (JP-P2002-89453A) discloses a hydraulic pressure controlling apparatus suitable for downsizing the apparatus and reducing costs. The hydraulic pressure controlling apparatus includes a pump for performing a pumping action by reciprocating a pump piston provided in a giant-magnetostrictive material through applying a current from a power source to a coil to stretch and shorten the giant-magnetostrictive element arranged in a central portion of the coil by magnetostrictive phenomenon, and a controlled portion which operates depending on discharge pressure from the pump. The hydraulic pressure controlling apparatus includes a current detection section adapted to detect the current passing the coil of the pump; and to estimate the discharge pressure of the pump based on the current detected by the detection section.

SUMMARY

An object of the present invention is to provide an actuation system with a smaller size and a lighter weight.

Another object of the present invention is to provide an actuation system with strong output force.

Still another object of the present invention is to provide an actuation system with a larger range of movement.

Another object of the present invention is to provide an actuation system which controls a movable member with higher precision.

Another object of the present invention is to provide a helicopter applied with an actuation system to reduce noises and vibrations more.

In an aspect of the present invention, an actuation system includes: a pump assembly configured to form a pump chamber; an actuator having first and second chambers and a movable member and configured to convert pressures applied to the first and second chambers into a movement of the movable member; a valve section; and a controller configured to control the valve section to open a first flow path between the pump chamber and the first chamber and close a second flow path between the pump chamber with the second chamber, during a discharge period during which the pump chamber is pressurized, in a first mode; to close the first flow path and open the second flow path during an intake period during which the pump chamber is depressurized, in the first mode; to close the first flow path and open the second flow path during the discharge period in a second mode; and to open the first flow path and close the second flow path during the intake period in the second mode.

In another aspect of the present invention, a helicopter includes the actuation systems mentioned above, and a rotor wing comprising blades and configured to generate propulsion by rotating the blades. The actuation system drives a flap provided inside each of the blades, to change an airfoil of the blades.

Also, in another aspect of the present invention, a helicopter includes the actuation systems mentioned above, and a rotor wing comprising blades and configured to generate propulsion by rotating the blades. The actuation system changes an orientation of each of the blades.

Also, in another aspect of the present invention, a pump includes a pump assembly configured to form a pump chamber; a valve section; and a controller configured to control the valve section to open a first flow path connected with the pump chamber and close a second flow path connected the pump chamber, during a discharge period during which the pump chamber is pressurized, in a first mode; to close the first flow path and open the second flow path during an intake period during which the pump chamber is depressurized, in the first mode; to close the first flow path and open the second flow path during the discharge period in a second mode; and to open the first flow path and close the second flow path during the intake period in the second mode.

In addition, in another aspect of the present invention, a control method of an actuation system is achieved by providing an actuation system comprising a pump assembly configured to form a pump chamber, an actuator having first and second chambers, a movable member and configured to convert pressures applied to the first and second chambers into a movement of the movable member, and a valve section; by setting a first mode in which the valve section is controlled to open a first flow path between the pump and the first chamber and close a second flow path between the pump and the second chamber, during a discharge period during which the pump chamber is pressurized, and to close the first flow path and open the second flow path during an intake period during which the pump chamber is depressurized; and by setting a second mode in which the valve section is controlled to close the first flow path and open the second flow path during the discharge period in a second mode, and to open the first flow path and close the second flow path during the intake period.

An actuation system according to the present invention can be designed in a smaller size and a lighter weight and is preferable to drive a flap of a blade of a helicopter and to change the orientation of the blade of the helicopter. The helicopter according to the present invention can reduce noises and vibrations and is designed in a smaller size and a lighter weight by removing a swash plate.

BRIEF DESCRIPTION OF THE DRAWINGS

FIG. 19 is a perspective view showing another embodiment of the helicopter according to the present invention.

DESCRIPTION OF THE PREFERRED EMBODIMENTS

Figure 1:
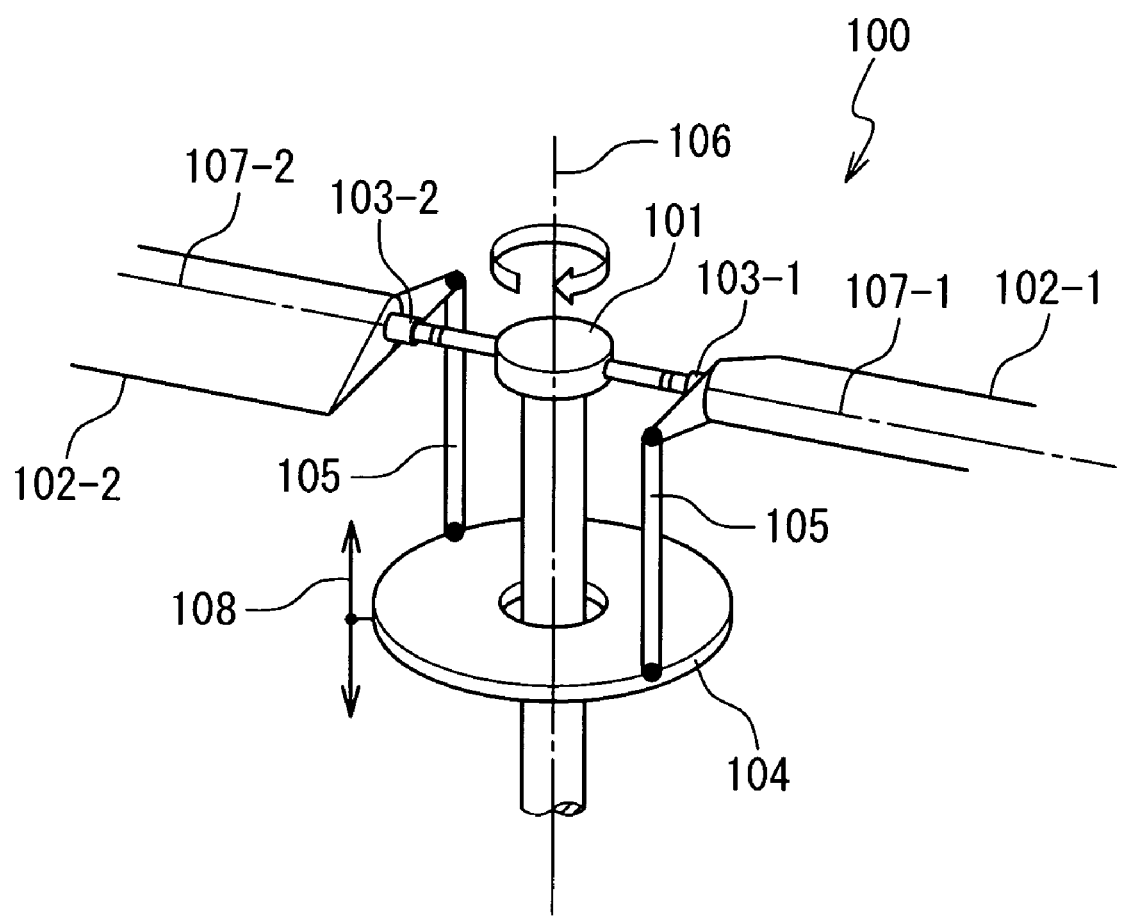
FIG. 1 is a perspective view showing a rotary wing of a conventional helicopter.
Figure 2:
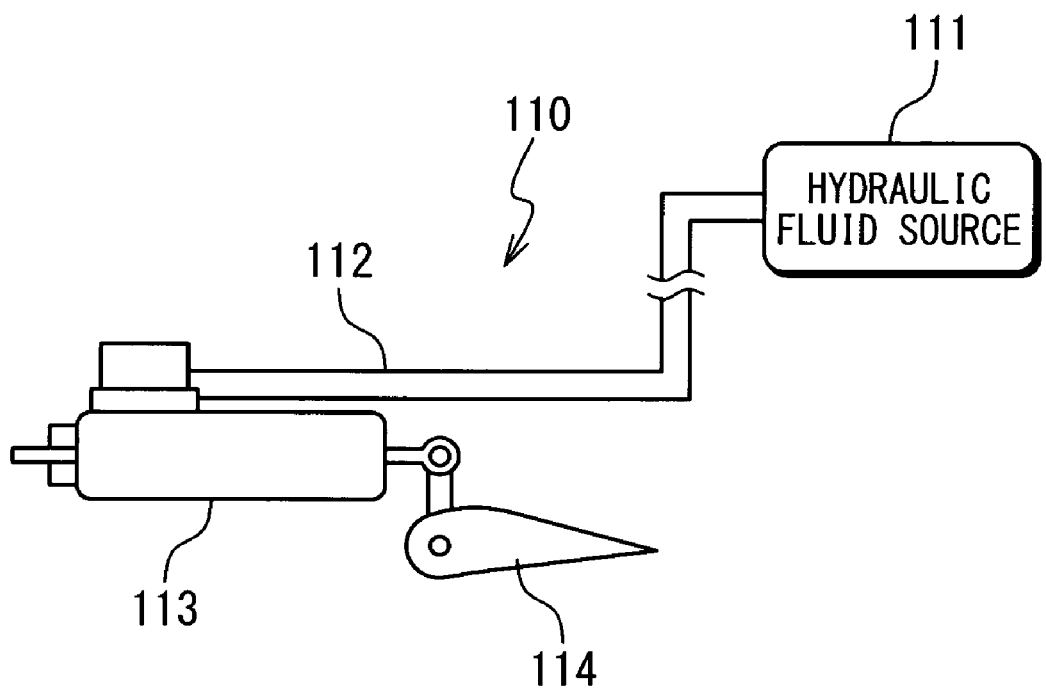
FIG. 2 is a block diagram showing a conventional driving apparatus.
Figure 3:
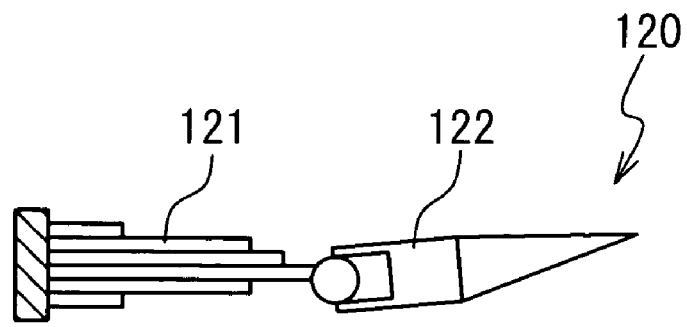
FIG. 3 is a section view showing a conventional driving device.
Figure 4:
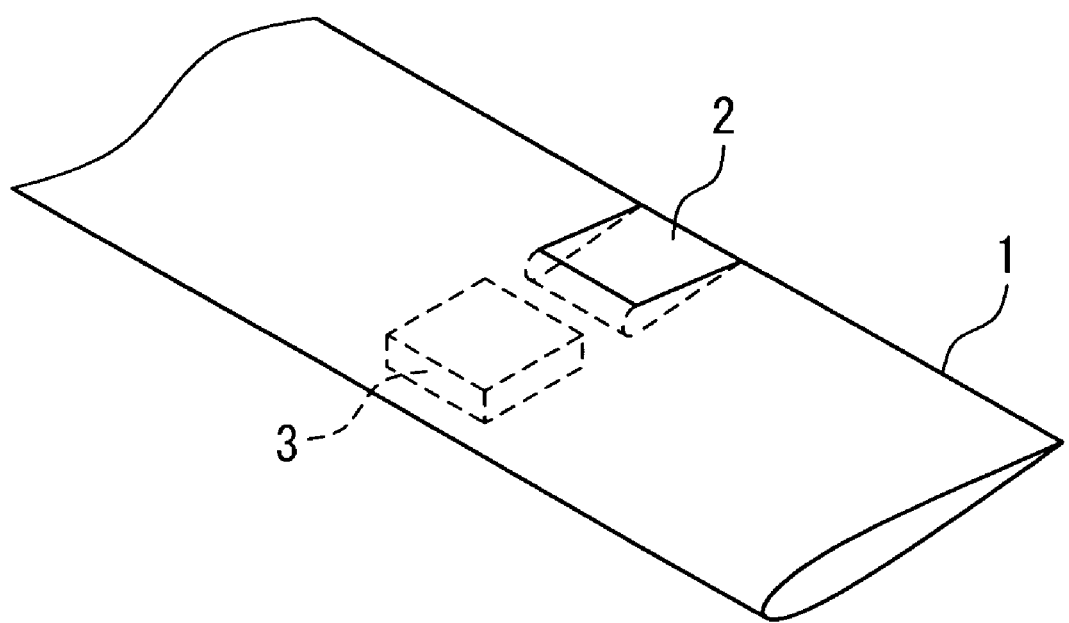
FIG. 4 is a block diagram showing a helicopter according to an embodiment of the present invention.

Hereinafter, a helicopter using an actuation system according to embodiments of the present invention will be described with reference to the attached drawings. In the helicopter, a rotary wing includes a plurality of blades 1 shown in FIG. 4. The rotary wing generates propulsion of the helicopter (for vertical ascent and descent, forward and backward movement, and hovering) according to the embodiments of the present invention by rotating the blades 1 to an airframe (not shown). The blade 1 has a cross section of an airfoil to generate lift force through the rotation of the blades 1, and includes a flap 2 and an actuation system 3. The flap 2 is arranged in a part of a posterior edge of the blade 1 and supported to be movable to the blade 1. The blade 1 changes its airfoil depending on a movement of the flap 2 with respect to the blade 1. The actuation system 3 is arranged inside the blade 1, drives the flap 2 with respect to the blade 1, and changes the airfoil of the blade 1.

Figure 5:
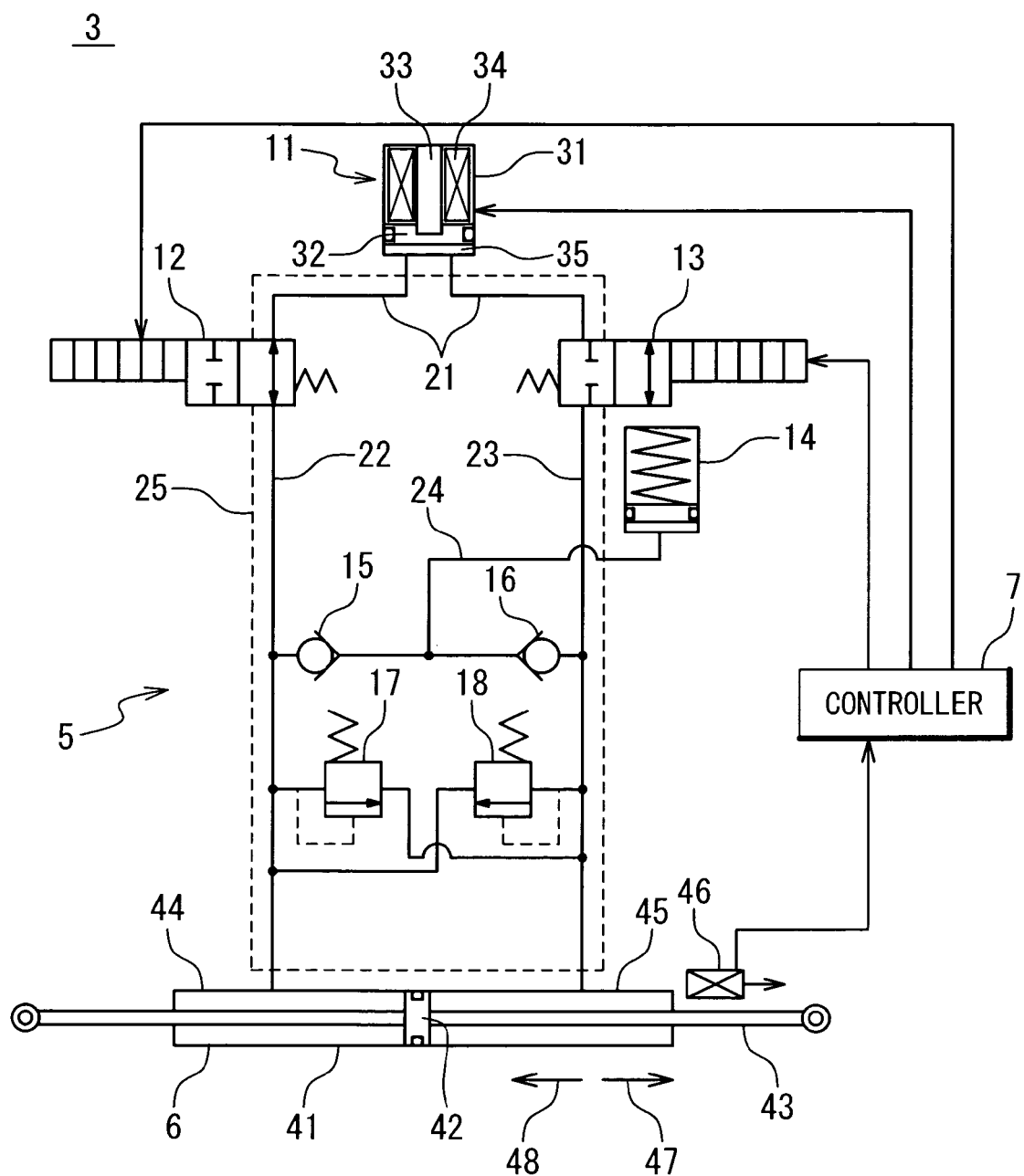
FIG. 5 is a diagram showing an actuation system with an hydraulic pressure circuit according to the embodiment of the present invention.

FIG. 5 shows the actuation system 3. The actuation system 3 includes a pump (assembly) 5 and an actuator 6. The pump 5 is composed of a hydraulic system and a controller 7. The hydraulic system includes a giant-magnetostrictive pump 11, piezoelectric valves 12 and 13, an accumulator 14, check valves 15 and 16, and relief valves 17 and 18, and includes flow paths 21 to 24. The piezoelectric valves 12 and 13, the check valves 15 and 16, and the relief valves 17 and 18 in the hydraulic system are arranged inside a manifold block 25.

The giant-magnetostrictive pump 11 includes a cylinder 31, a piston 32, a giant-magnetostrictive element 33, and a coil 34. The cylinder 31 has a sliding surface of a cylindrical shape. The piston 32 is arranged to internally contact the sliding surface of the cylinder 31 and inserted in the cylinder 31 to be slidable in a direction parallel to an axis of the cylinder 31. That is to say, the giant-magnetostrictive pump 11 has a pump chamber 35 formed by the cylinder 31 and the piston 32. The pump chamber 35 is connected to the flow paths 21. The coil 34 converts electric energy supplied from the controller 7 into magnetic energy. The giant-magnetostrictive element 33 is deformed based on the magnetic energy generated by the coil 34. The giant-magnetostrictive element 33 is coupled to the cylinder 31 at one end thereof and connected to the piston 32 at another end. The giant-magnetostrictive element 33 changes a capacity of the pump chamber 35 by driving the piston 32 with respect to the cylinder 31 because of the deformation. In this case, a magnitude of a drive stroke of the piston 32 is approximately 0.1 mm as an example. That is to say, the giant-magnetostrictive pump 11 is controlled by the controller 7, and raises a hydraulic pressure in the flow path 21 or falls the hydraulic pressure in the flow path 21.

The piezoelectric valve 12 has a variable orifice between the flow path 21 and the flow path 22 and includes a piezoelectric element. The piezoelectric element is deformed based on a voltage applied by the controller 7, to widen and narrow an opening area of the variable orifice. That is to say, the piezoelectric valve 12 is controlled by the controller 7, connects the flow path 21 with the flow path 22 so that the hydraulic pressure can be transmitted or disconnects the flow path 21 from the flow path 22 so that the hydraulic pressure cannot be transmitted.

The piezoelectric valve 13 has a variable orifice between the flow path 21 and the flow path 23 and includes a piezoelectric element. The piezoelectric element is deformed based on a voltage applied from the controller 7, and widens and narrows an opening area of the variable orifice. That is to say, the piezoelectric valve 13 is controlled by the controller 7, connects the flow path 21 with the flow path 23 so that the hydraulic pressure can be transmitted or disconnects the flow path 21 from the flow path 23 so that the hydraulic pressure cannot be transmitted.

The accumulator 14 is provided with a container of a variable volume and a spring. The spring generates elastic force to reduce the volume of the container and maintains the hydraulic action fluid filled in the container to a predetermined hydraulic pressure. The container is connected to the flow path 24. That is to say, the accumulator 14 maintains the hydraulic pressure in the flow path 24 to the predetermined pressure. The check valve 15 opens between the flow path 24 and the flow path 22 when the hydraulic pressure in the flow path 24 is larger than that in the flow path 22, and closes between the flow path 24 and the flow path 22 when the hydraulic pressure in the flow path 24 is smaller than the hydraulic pressure in the flow path 22. The check valve 16 opens between the flow path 24 and the flow path 23 when the hydraulic pressure in the flow path 24 is larger than that in the flow path 23, and closes between the flow path 24 and the flow path 23 when the hydraulic pressure in the flow path 24 is smaller than that in the flow path 23. That is to say, the accumulator 14, and the check valves 15 and 16 prevent the hydraulic pressure in the flow path 22 from being smaller than the predetermined hydraulic pressure and prevent the hydraulic pressure in the flow path 23 from being smaller than the predetermined hydraulic pressure.

The relief valve 17 has a predetermined pressure being set, and opens a path between the flow path 22 and the flow path 23 when the hydraulic pressure in the flow path 22 is larger than the set pressure and closes the path between the flow path 22 and the flow path 23 when the hydraulic pressure in the flow path 22 is smaller than the set pressure. That is to say, the relief valve 17 controls the hydraulic pressure in the flow path 22 so as not to be larger than the set pressure. The relief valve 18 has a predetermined pressure being set, and opens a path between the flow path 23 and the flow path 22 when the hydraulic pressure in the flow path 23 is larger than the set pressure and closes the path between the flow path 23 and the flow path 22 when the hydraulic pressure in the flow path 23 is smaller than the set pressure. That is to say, the relief valve 18 controls the hydraulic pressure in the flow path 23 so as not to be larger than the set pressure.

Such a pump 5 can be designed to be smaller in size and lighter in weight, thus the actuation system 3 can be made smaller in size and lighter in weight.

The actuator 6 includes a cylinder 41, a piston 42, and a movable member 43. The cylinder 41 has a sliding surface in a cylindrical shape and is connected to a body of the blade 1. The piston 42 is arranged to internally contact the sliding surface of the cylinder 41 and is inserted to be slidable in a direction parallel to an axis of the cylinder. The piston 42 divides an interior portion of the cylinder 41 into a first chamber 44 and a second chamber 45. The first chamber 44 is connected to the flow path 22. The second chamber 45 is connected to the flow path 23. The movable member 43 is formed from a rigid body, a portion thereof is connected to the piston 42, and another portion thereof is connected to the flap 2. That is to say, the actuator 6 drives the movable member 43 to a first direction 47 when the hydraulic pressure in the flow path 22 is larger than the hydraulic pressure in the flow path 23 and drives the movable member 43 to a second direction 48 opposite to the first direction 47 when the hydraulic pressure in the flow path 22 is smaller than that in the flow path 23.

The actuation system 3 further includes a sensor 46. The sensor 46 measures a displacement of the movable member 43 and outputs the displacement to the controller 7.

The helicopter according to the embodiment of the present invention further includes a power supply unit, a control unit, and a slip ring which are not shown. The power supply unit is arranged in the airframe of the helicopter and generates power. The control unit is arranged in the airframe of the helicopter and generates an electric signal indicating a target position of the flap 2 is operated by a pilot of the helicopter. The slip ring forms a transmission path which passes a current from the airframe side of the helicopter to the side of the blade 1, supplies the power from the power supply unit to the controller 7 and transmits the signal from the control unit to the controller 7.

The controller 7 collects a displacement of the movable member 43 of the actuator 6 from the sensor 46, collects a target position of the flap 2 from the control unit, and controls the actuation system 3 so that the flap 2 can be arranged on the target position.

A controlling method of the actuation system according to the embodiment of the present invention is performed by the controller 7 and has a first mode, a second mode, and an operation of switching the mode. In the mode switching operation, the controller 7 changes the mode based on a displacement collected from the sensor 46 and a target position from the control unit. That is to say, the controller 7 selects the first mode when the movable member 43 of the actuator 6 needs to be driven into the first direction 47 in order to drive the flap 2 to the target position, and selects the second mode when the movable member 43 of the actuator 6 needs to be driven to the second direction 48 in order to drive the flap 2 to the target position.

Figure 6:
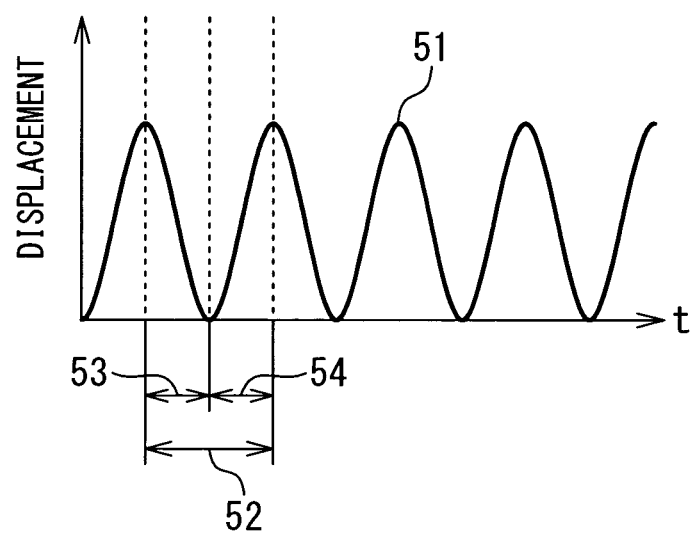
FIG. 6 is a graph showing a change of the displacement of a piston in a giant-magnetostrictive pump.

FIG. 6 shows a change of the displacement of the piston 32 of the giant-magnetostrictive pump 11 controlled by the controller 7 when the first mode (or the second mode) is selected. The displacement is larger when a volume of the pump chamber 35 is larger. A change 51 shows that the displacement periodically changes every a period 52. The frequency is, for example, a hundred Hz to several hundreds Hz. The period 52 includes a discharge period 53 and an intake period 54. The change 51 shows that its displacement monotonously reduces in the discharge period 53 and its displacement monotonously increases in the intake period 54, namely, shows that the hydraulic pressure in the pump chamber 35 (the flow path 21) monotonously increases in the discharge period 53 and monotonously reduces in the intake period 54. That is to say, the controller 7 controls the giant-magnetostrictive pump 11 so that the hydraulic pressure of the pump chamber 35 (the flow path 21) can monotonously increases in the discharge period 53 and monotonously reduces in the intake period 54 by supplying power to the coil 34 so that the giant-magnetostrictive element 33 can drive the piston 32, as shown in the change 51.

Figure 7:
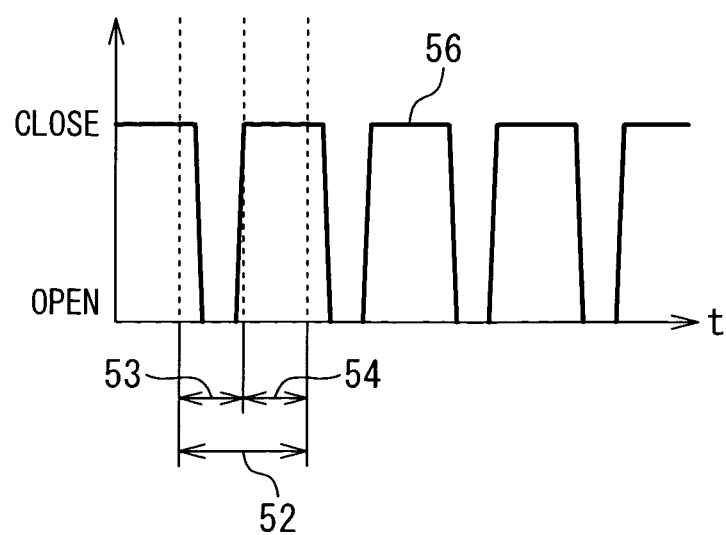
FIG. 7 is a graph showing a change of the state of a piezoelectric valve in a first mode.

FIG. 7 shows a change of the state of the piezoelectric valve 12 controlled by the controller 7 when the first mode is selected. A change 56 shows that the state periodically changes every the period 52 and shows that the state changes in synchronization with the displacement of the piston 32. The change 56 shows that a connection between the flow path 21 and the flow path 22 is closed in the intake period 54, the connection between the flow path 21 and the flow path 22 is opened after a predetermined time from time when the discharge period 53 starts, and the connection between the flow path 21 and the flow path 22 is closed before the discharge period 53 ends.

Figure 8:
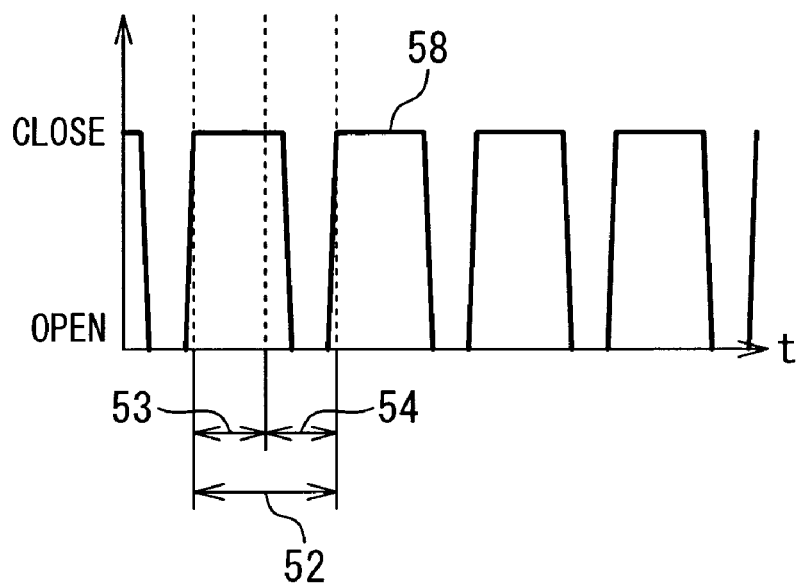
FIG. 8 is a graph showing a change of the state of another piezoelectric valve in the first mode.

FIG. 8 shows a change of the state of the piezoelectric valve 13 controlled by the controller 7 when the first mode is selected. The change 58 shows that the state of the piezoelectric valve 13 periodically changes every the period 52 and shows that the state of the piezoelectric valve 13 changes in synchronization with the displacement of the piston 32. The change 58 shows that a connection between the flow path 21 and the flow path 23 is closed in the discharge period 53, the connection between the flow path 21 and the flow path 23 is opened after a predetermined time from time when the intake period 54 starts, and the connection between the flow path 21 and the flow path 23 is closed before the intake period 54 ends.

Figure 9:
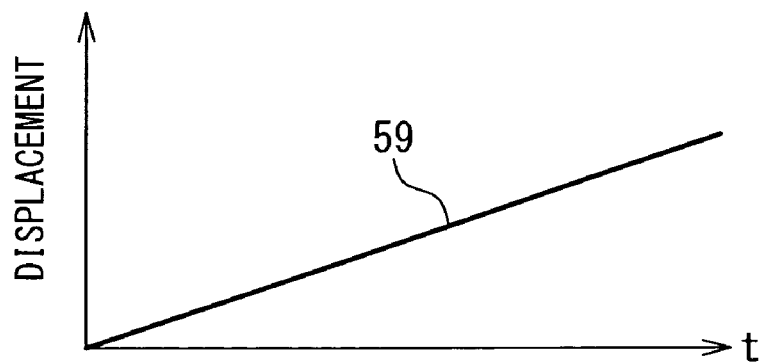
FIG. 9 is a graph showing a change of the displacement of a movable member of an actuator in the first mode.

According to such an operation in the first mode, the fluid is supplied from the flow path 23 to the flow path 21 and the fluid is supplied from the flow path 21 to the flow path 22. At this moment, the movable member 43 of the actuator 6 moves to the first direction 47 as shown in a change 59 in FIG. 9.

When the second mode is selected, the controller 7 controls the giant-magnetostrictive pump 11 in a similar manner to a case that the first mode is selected. That is to say, a change of the displacement of the piston 32 of the giant-magnetostrictive pump 11 is same as the change 51 shown in FIG. 6.

Figure 10:
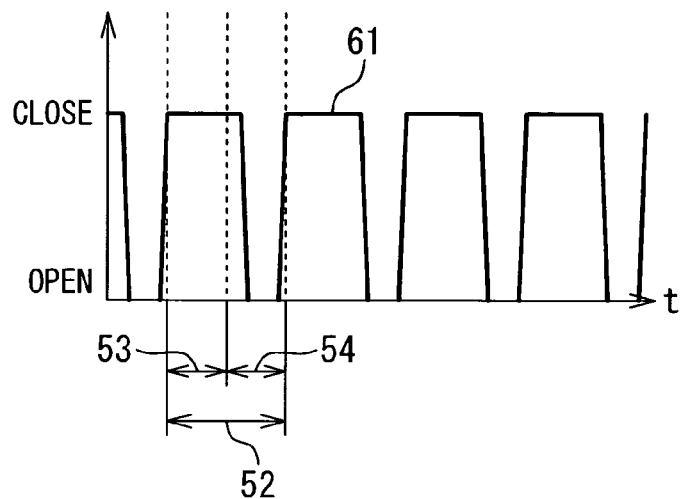
FIG. 10 is a graph showing a change of the state of the piezoelectric valve in a second mode.

FIG. 10 shows a change of the state of the piezoelectric valve 12 controlled by the controller 7 when the second mode is selected. A change 61 shows that the state of the piezoelectric valve 12 periodically changes every the period 52 and shows that the state of the piezoelectric valve 12 changes in synchronization with the displacement of the piston 32. The change 61 shows that a connection between the flow path 21 and the flow path 22 is closed in the discharge period 53, the connection between the flow path 21 and the flow path 22 is opened after a predetermined time from time when the intake period 54 starts, and the connection between the flow path 21 and the flow path 22 is closed before the intake period 54 ends.

Figure 11:
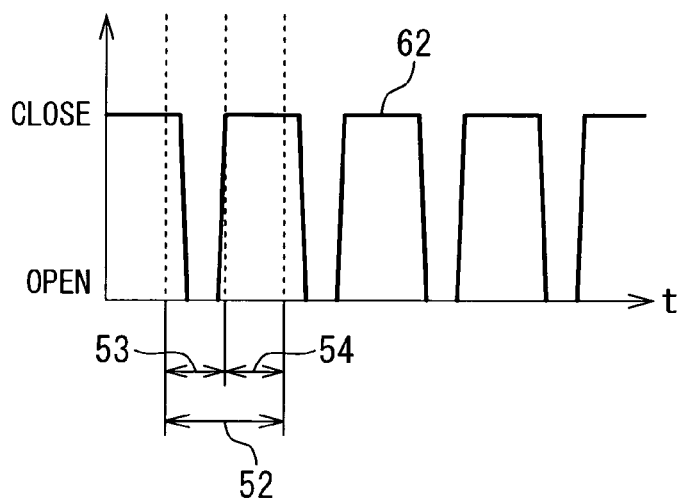
FIG. 11 is a graph showing a change of the state of the other piezoelectric valve in the second mode.

FIG. 11 shows a change of the state of the piezoelectric valve 13 controlled by the controller 7 when the second mode is selected. A change 62 shows that the state of the piezoelectric valve 13 periodically changes every the period 52 and shows that the state of the piezoelectric valve 13 changes in synchronization with the displacement of the piston 32. The change 62 shows that a connection between the flow path 21 and the flow path 23 is closed in the intake period 54, the connection between the flow path 21 and the flow path 23 is opened after a predetermined time from time when the discharge period 53 starts, and the connection between the flow path 21 and the flow path 23 is closed before the discharge period 53 ends.

Figure 12:
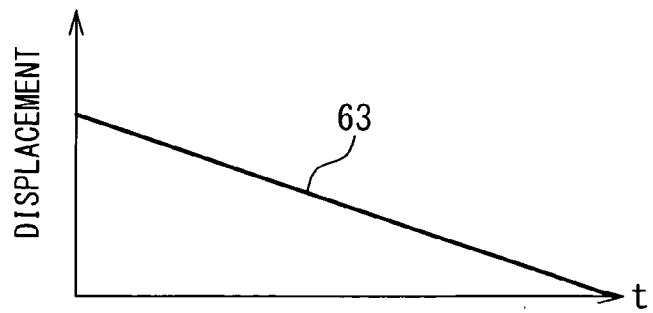
FIG. 12 is a graph showing a change of a displacement of the movable member of the actuator in the second mode.

According to such an operation in the second mode, the fluid is supplied from the flow path 22 to the flow path 21 and the fluid is supplied from the flow path 21 to the flow path 23. At this moment, the movable member 43 of the actuator 6 moves into the second direction 48, as shown by the change 63 in FIG. 12.

According to the controlling method of the actuation system according to the embodiment of the present invention, the actuation system 3 can enlarge the stroke of the movable member 43 and drive the movable member 43 to a target position with higher precision, compared to a direct movement type in which the stroke is limited based on displacement amount of the giant-magnetostrictive element.

It should be noted that the giant-magnetostrictive pump 11 may be replaced by another pump which does not include the giant-magnetostrictive element 33. Such a pump is exemplified by a pump configured by replacing the giant-magnetostrictive element 33 of the giant-magnetostrictive pump 11 by a piezoelectric element. Such a pump changes the hydraulic pressure in the flow path 21 through deformation of the piezoelectric element by applying a voltage to the piezoelectric element. The giant-magnetostrictive pump 11 is preferable in that a larger hydraulic pressure can be generated, compared to the pump.

In addition, it should be noted that the controlling method of the actuation system can change the frequency of the displacement of the piston 32 of the giant-magnetostrictive pump 11. Such a change of the frequency can vary a magnitude of deformation of the giant-magnetostrictive element 33 of the giant-magnetostrictive pump 11 and reduce heat generation of the giant-magnetostrictive pump 11.

Moreover, the actuation system 3 can be employed to drive a device different from the flap 2 of the blade 1 in the helicopter. As the device, the joint of a robot is shown as an example.

Furthermore, the pump 5 can be used for a purpose different from generation of a hydraulic pressure to the actuator 6. As the purpose, conveying medical solutions for a medical treatment and conveying liquid reagents for a chemical experiment are shown as examples.

Figure 13:
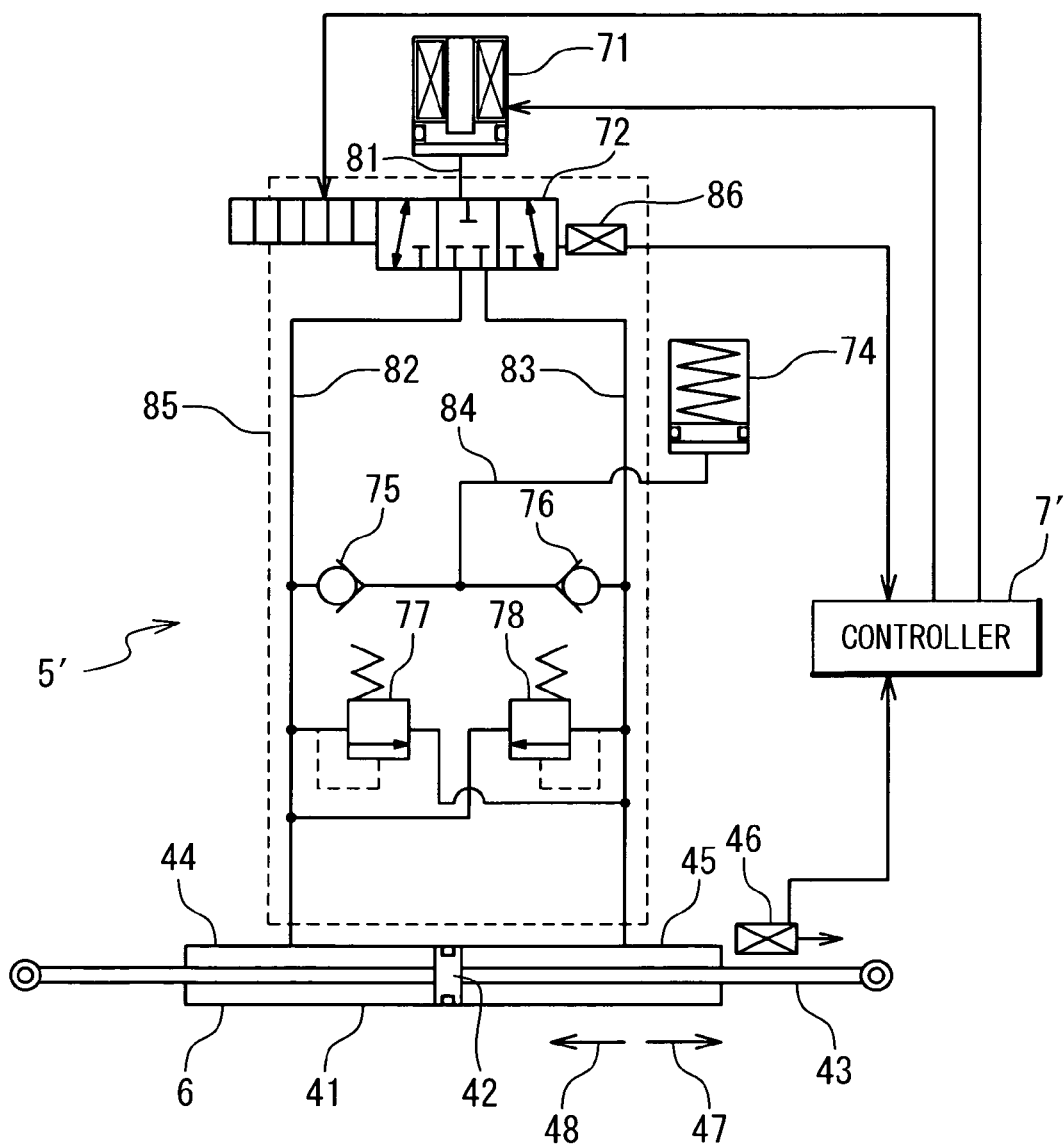
FIG. 13 is a diagram showing the actuation system with the hydraulic pressure circuit according to another embodiment of the present invention.

FIG. 13 shows the actuation system according to another embodiment of the present invention. In an actuation system 3', the pump 5 in the above-mentioned embodiment is replaced by another pump 5'. The pump 5' is composed of a hydraulic pressure system and a controller 7'. The hydraulic pressure system includes a giant-magnetostrictive pump 71, a piezoelectric switching valve 72, an accumulator 74, check valves 75 and 76, and relief valves 77 and 78, and includes flow paths 81 to 84. The piezoelectric switching valve 72, the check valves 75 and 76, the relief valves 77 and 78 in the hydraulic pressure system are formed inside a manifold block 85.

The giant-magnetostrictive pump 71 is formed in similar manner as the giant-magnetostrictive pump 11 in the above described embodiment, controlled by the controller 7', causes an ascent or a descent of the hydraulic pressure in the flow path 81.

The piezoelectric switching valve 72 includes a cylinder, a spool, and a piezoelectric element. The cylinder has a sliding surface in a cylindrical shape. The spool is arranged to internally contact the sliding surface of the cylinder and inserted to be slidable in a direction parallel to an axis of the cylinder. The piezoelectric element is deformed based on a voltage applied from the controller 7', to drive the spool in a cylinder hollow of the cylinder. The spool can be arranged on one position selected from a neutral position, a first position, and a second position. The piezoelectric element drives the spool from the neutral position to the first position, from the neutral position to the second position, from the first position to the neutral position, and from the second position to the neutral position under the control of the controller 7'.

The piezoelectric switching valve 72 includes a first port connected to the flow path 81, a second port connected to the flow path 82, and a third port connected to the flow path 83. The cylinder and the spool form a variable orifice between the flow path 81 and the flow path 82 and form a variable orifice between the flow path 81 and the flow path 83. The variable orifice formed between the flow path 81 and the flow path 82 is closed when the spool is arranged on the neutral position or the second position, and enlarges its opening area as the spool moves from the neutral position to the first position. The variable orifice formed between the flow path 81 and the flow path 83 is closed when the spool is arranged on the neutral position or the first position, and enlarges its opening area as the spool moves from the neutral position to the second position.

The piezoelectric switching valve 72 is preferable in prevention of the flow path 82 and the flow path 83 from connecting to each other, compared to the piezoelectric valve 12 and the piezoelectric valve 13 in the above-described embodiment.

The accumulator 74 maintains a hydraulic pressure in the flow path 84 to a predetermined pressure in a same manner as the accumulator 14 in the above-described embodiment. The check valve 75 opens between the flow path 84 and the flow path 82 when the hydraulic pressure in the flow path 84 is larger than that in the flow path 82, and closes between the flow path 84 and the flow path 82 when the hydraulic pressure in the flow path 84 is smaller than that in the flow path 82. The check valve 76 opens between the flow path 84 and the flow path 83 when the hydraulic pressure in the flow path 84 is larger than that in the flow path 83, and closes between the flow path 84 and the flow path 83 when the hydraulic pressure in the flow path 84 is smaller than that in the flow path 83. That is to say, the accumulator 74, and the check valves 75 and 76 prevent the hydraulic pressure in the flow path 82 from being smaller than the predetermined hydraulic pressure and prevent the hydraulic pressure in the flow path 83 from being smaller than the predetermined hydraulic pressure.

The relief valve 77 is set to a predetermined pressure, and opens between the flow path 82 and the flow path 83 when the hydraulic pressure in the flow path 82 is larger than the set pressure and closes between the flow path 82 and the flow path 83 when the hydraulic pressure in the flow path 82 is smaller than the set pressure. That is to say, the relief valve 77 controls the hydraulic pressure in the flow path 82 not to become larger than the set pressure. The relief valve 78 is set to a predetermined pressure, and opens between the flow path 83 and the flow path 82 when the hydraulic pressure in the flow path 83 is larger than the set pressure and closes between the flow path 83 and the flow path 82 when the hydraulic pressure in the flow path 83 is smaller than the set pressure. That is to say, the relief valve 78 controls the hydraulic pressure in the flow path 83 not to be larger than the set pressure.

The actuation system 3' further includes a sensor 86. The sensor 86 measures a position of the spool in the piezoelectric switching valve 72 and outputs the position to the controller 7'.

The controller 7' collects the displacement of the movable member 43 in the actuator 6 from the sensor 46, collects the target position of the flap 2 from the control unit, collects the position of the spool in the piezoelectric switching valve 72 from the sensor 86, and controls the actuation system 3' so that the flap 2 can be arranged on the target position.

A controlling method of the actuation system according to another embodiment of the present invention is performed by the controller 7' and has a first mode, a second mode and an operation switching mode. In an operation switching mode, the controller 7' switches the mode based on the displacement collected from the sensor 46 and the target position collected from the control unit. That is to say, the controller 7' selects the first mode when the movable member 43 of the actuator 6 needs to be driven to the first direction 47 in order to drive the flap 2 to the target position, and selects the second mode when the movable member 43 of the actuator 6 needs to be driven to the second direction 48 in order to drive the flap 2 to the target position.

Figure 14:
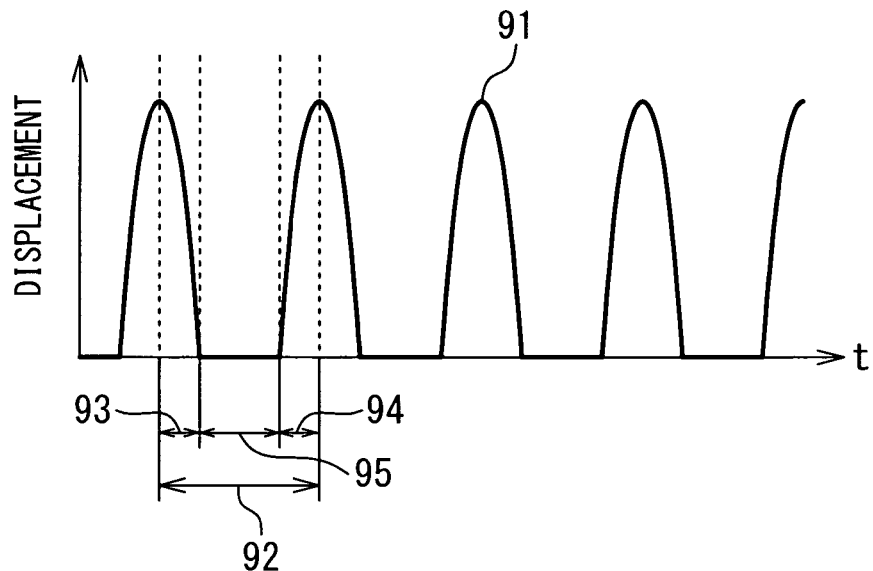
FIG. 14 is a graph showing the change of the displacement of the piston in the giant-magnetostrictive pump.

FIG. 14 shows a change of the displacement of the piston of the giant-magnetostrictive pump 71 controlled by the controller 7' when the first mode (or the second mode) is selected. An increase of the displacement shows that the giant-magnetostrictive pump 71 increases the hydraulic pressure in the flow path 81 and a decrease of the displacement shows that the giant-magnetostrictive pump 71 decreases the hydraulic pressure in the flow path 81. A change 91 shows that the displacement periodically changes every a period 92. The period 92 includes a discharge period 93, an intake period 94, and a suspended period 95. The change 91 shows that the displacement monotonously reduces in the discharge period 93, the displacement monotonously increases in the intake period 94, and the displacement is constant in the suspended period 95. That is to say, the change 91 shows that the hydraulic pressure in the flow path 81 monotonously increases in the discharge period 93, monotonously decreases in the intake period 94, and is constant on the suspended period 95. That is to say, the controller 7' controls the giant-magnetostrictive pump 71 so that the hydraulic pressure in the flow path 81 can monotonously increase in the discharge period 93, monotonously decrease in the intake period 94, and be constant on the suspended period 95, as shown in the change 91.

Figure 15:
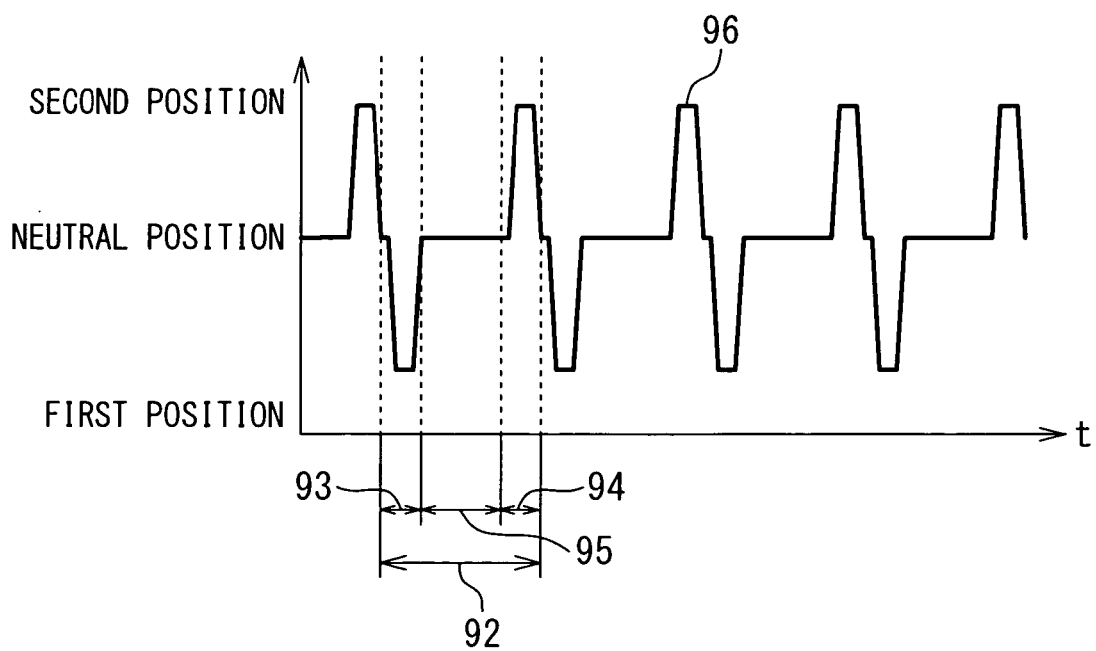
FIG. 15 is a graph showing a change of the state of a piezoelectric switching valve in the first mode.

FIG. 15 shows a change of the position of the spool of the piezoelectric switching valve 72 controlled by the controller 7' when the first mode is selected. The change 96 shows that the state of the spool periodically changes every the period 92 and that the state of the spool changes in synchronization with the displacement of the piston of the giant-magnetostrictive pump 71. The change 96 shows that the spool is arranged on the neutral position in the suspended period 95, that the spool is driven to the first position after a predetermined time from time when the discharge period 93 starts, that the spool is driven to the neutral position before the discharge period 93 ends, that the spool is driven to the second position after a predetermined time from time when the discharge period 94 starts, and that the spool is driven to the neutral position before the discharge period 94 ends.

Figure 16:
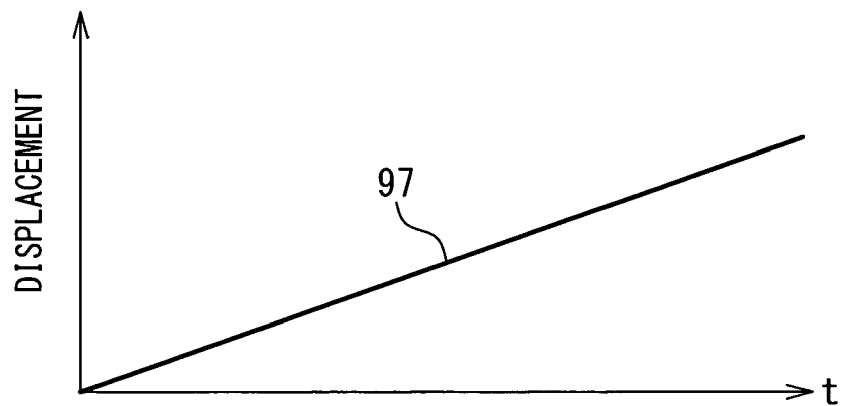
FIG. 16 is a graph showing the change of the displacement of the movable member of the actuator in the first mode.

According to such an operation of the first mode, the hydraulic action fluid is supplied from the flow path 83 to the flow path 81 and the hydraulic action fluid is supplied from the flow path 81 to the flow path 82. At this moment, the movable member 43 of the actuator 6 moves to the first direction 47, as shown in the change 97 in FIG. 16.

When the second mode is selected, the controller 7' controls the giant-magnetostrictive pump 71 in the same manner when the first mode is selected. That is to say, a change of the displacement of the piston of the giant-magnetostrictive pump 71 is equal to the change 91 shown in FIG. 14.

Figure 17:
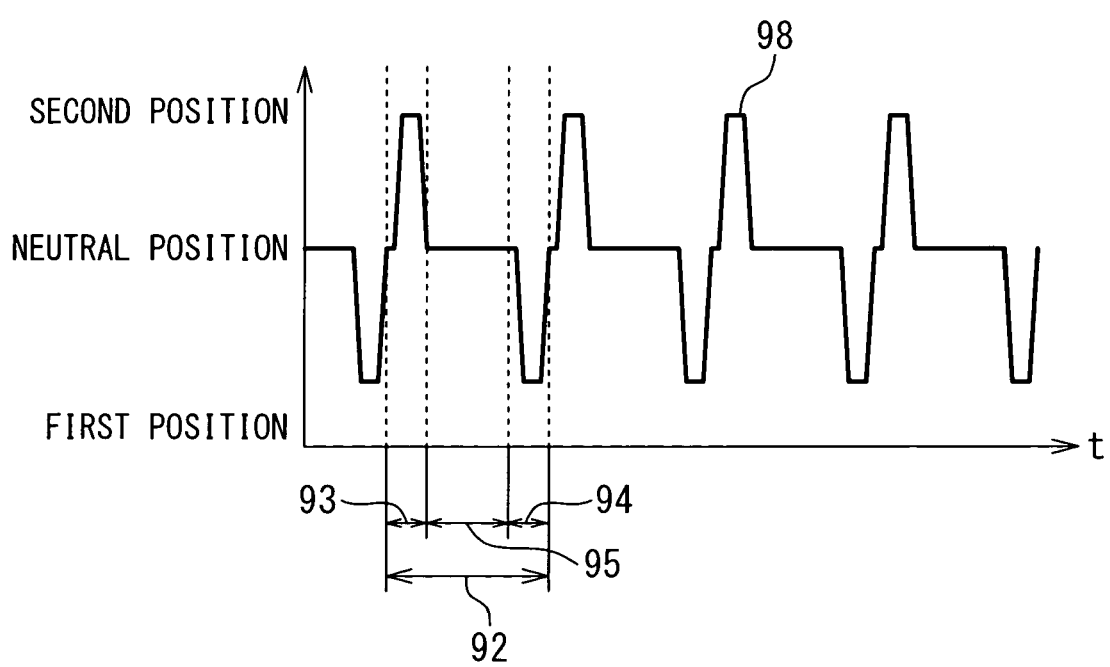
FIG. 17 is a graph showing a change of the state of a piezoelectric switching valve in the second mode.

FIG. 17 shows a change of a position of the spool of the piezoelectric switching valve 72 controlled by the controller 7' when the second mode is selected. The change 98 shows that the state of the spool periodically changes every the period 92 and that the state of the spool changes in synchronization with the displacement of the piston of the giant-magnetostrictive pump 71. The change 98 shows that the spool is arranged on the neutral position in the suspended period 95, that the spool is driven to the second position after a predetermined time from time when the discharge period 93 starts, that the spool is driven to the neutral position before the discharge period 93 ends, that the spool is driven to the first position after a predetermined time from time when the discharge period 94 starts, and that the spool is driven to the neutral position before the discharge period 94 ends.

Figure 18:
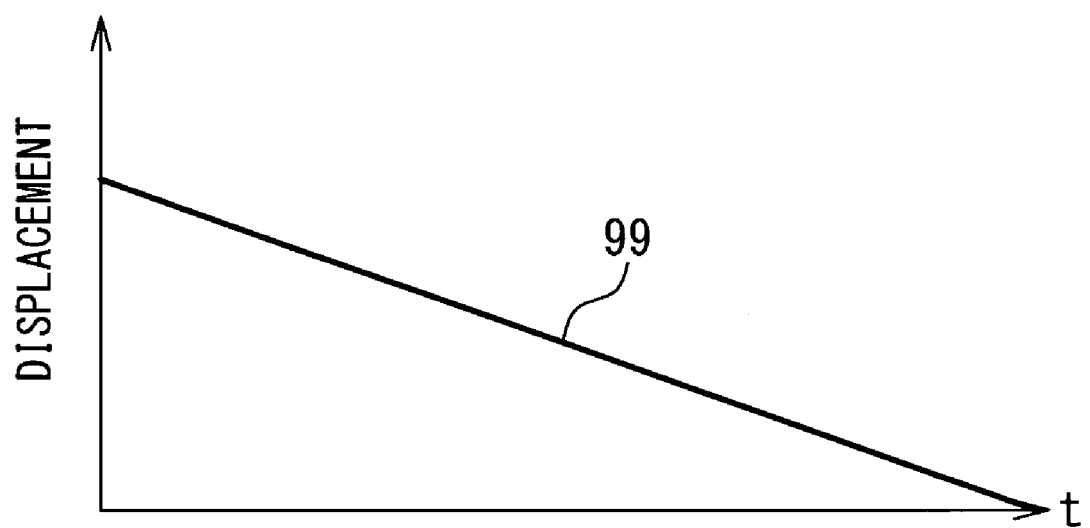
FIG. 18 is a graph showing the change of the displacement of the movable member of the actuator in the second mode.

According to such an operation of the second mode, the hydraulic action fluid is supplied from the flow path 82 to the flow path 81 and the hydraulic action fluid is supplied from the flow path 81 to the flow path 83. At this moment, the movable member 43 of the actuator 6 moves to the second direction 48, as shown in the change 99 in FIG. 18.

According to the controlling method of the actuation system according to the embodiment of the present invention, the actuation system 3' can enlarge the stroke of the movable member 43 and drive the movable member 43 to a target position with higher precision in a similar manner as the controlling method of the actuation system in the above described embodiment. Furthermore, the controlling method of the actuation system can reduce heat generation of the giant-magnetostrictive pump 71 by providing the suspended period 95 during which the giant-magnetostrictive element of the giant-magnetostrictive pump 71 is not deformed.

In the helicopter according to the embodiment of the present invention, a rotary wing is provided for an airframe. As shown in FIG. 19, the rotary wing 200 includes a rotor 201, blades 202-1 to 202-2, and bearings 203-1 to 203-2, and includes the actuation system 3 in the above described embodiment. The rotor 201 is arranged in an upper portion of the airframe (not shown) of the helicopter and rotates around a rotation axis 206 of the airframe. The blades 202-*i* (i=1, 2) constitute a wing. The bearings 203-*i* are supported by the rotor 201 and support the blades 202-*i* rotatably around the rotation axes 207-*i*. The actuation system 3 is supported by the rotor 201 or a plate instead of a swash plate.

The helicopter according to the embodiment of the present invention further includes a power supply unit, a control unit, and a slip ring which are not shown. The power supply unit is arranged in the airframe of the helicopter to generate power. The control unit is arranged in the airframe of the helicopter and is operated by a pilot of the helicopter to generate an electric signal indicating a target angle of the blade 202-*i*. The slip ring forms a transmission path which passes current from the airframe side of the helicopter to the side of the rotor 201, supplies the power from the power supply unit to the actuation system 3, and transmits the electric signal from the control unit to the actuation system 3.

The actuation system 3 collects a target angle of the blade 202-*i* from the control unit, and changes the orientation of the blades 202-*i* so that the blades 202-*i* can be set to the target angle. In addition, the actuation system 3 can be replaced by the actuation system 3' in the above described embodiment.

Such a helicopter can remove the swash plate for changing the orientation of the blades 202-1 to 202-2, and it is preferable.

In addition, the actuation system 3 can be arranged on another position. As the position, an inside of the blade 202-*i* is shown as an example.

It should be noted that the actuation system 3 can be supported by the swash plate (not shown). The swash plate is supported by the rotor 201 in parallel to the rotation axis 201 and is movable in parallel. In this case, the swash plate can switch pitch angles of the blades 202-1 to 202-2 by parallel moving is operated by a pilot of the helicopter. The helicopter described above is further preferable in that pitch angles of the blades 202-1 to 202-2 can be changed by both the swash plate and the actuation system 3, a controllability of the helicopter is improved, and noises and vibrations are reduced.

In addition, the blades 202-1 to 202-2 can include the flap 2 and the actuation system 3 in a similar manner as the blade 1 in the above-described embodiment. The helicopter described above is further preferable in the improvement of the controllability of the helicopter, the reduction of noises and vibrations, and downsizing and weight reducing.

What is claimed is:

1. An actuation system comprising:
   a pump assembly including a pump chamber;
   an actuator having first and second chambers and a movable member and configured to convert pressures applied to said first and second chambers into a movement of said movable member;
   a valve section; and
   a controller configured to control said valve section to:
   (i) open a first flow path between said pump chamber and said first chamber and close a second flow path between said pump chamber with said second chamber, during a discharge period during which said pump chamber is pressurized, in a first mode;

(ii) close said first flow path and open said second flow path during an intake period during which said pump chamber is depressurized, in the first mode;

(iii) close said first flow path and open said second flow path during the discharge period in a second mode; and (iv) open said first flow path and close said second flow path during the intake period in the second mode, wherein said valve section has a plurality of positions set by said controller, and wherein the plurality of plurality of positions includes:

(i) a first position in which said valve section opens said first flow path and closes said second flow path;

(ii) a second position in which said valve section closes said first flow path and opens said second flow path; and (iii) a neutral position in which said valve section closes said first and second flow paths.

2. The actuation system according to claim 1, wherein said pump assembly comprises:

a coil configured to generate a magnetic field; and a giant-magnetostrictive element deformed based on the generated magnetic field, wherein a capacity of said pump chamber is changed through the deformation of said giant-magnetostrictive element, and wherein said controller controls said coil to change the capacity of said pump chamber.

3. The actuation system according to claim 2, wherein said valve section comprises:

a first valve configured to open or close said first flow path; and a second valve configured to open or close said second flow path.

4. The actuation system according to claim 2, wherein said valve section comprises a switching valve configured to be set to one of the plurality of positions by said controller.

5. The actuation system according to claim 1, further comprising:

a sensor configured to measure a displacement of said movable member.

6. The actuation system of claim 5, wherein the controller is configured to switch between the first mode and the second mode based on the displacement of the movable member measured by the sensor.

7. The actuation system of claim 1, wherein the controller is configured to switch between the first mode and the second mode based on a displacement of the movable member.

8. A helicopter comprising:

a rotor wing comprising blades and configured to generate propulsion by rotating said blades; and actuation systems configured to drive the blades, respectively, wherein each of the actuation systems comprises:

a pump assembly including a pump chamber;

an actuator having first and second chambers and a movable member connected to said blade and configured to convert pressures applied to said first and second chambers into a movement of said movable member;

a valve section; and a controller configured to control said valve section to:

(i) open a first flow path between said pump chamber and said first chamber and close a second flow path between said pump chamber with said second chamber, during a discharge period during which said pump chamber is pressurized, in a first mode;

(ii) close said first flow path and open said second flow path during an intake period during which said pump chamber is depressurized, in the first mode;

(iii) close said first flow path and open said second flow path during the discharge period in a second mode;

(iv) open said first flow path and close said second flow path during the intake period in the second mode, wherein said valve section has a plurality of positions set by said controller, and wherein the plurality of plurality of positions includes:

(i) a first position in which said valve section opens said first flow path and closes said second flow path;

(ii) a second position in which said valve section closes said first flow path and opens said second flow path; and (iii) a neutral position in which said valve section closes said first and second flow paths is.

9. The helicopter according to claim 8, wherein a flap is provided inside each of said blades, each actuation system drives a respective one of the flaps to change an airfoil of said blades.

10. The helicopter according to claim 8, wherein said actuation systems drive said blades to change an orientation of each of said blades.

11. The helicopter of claim 8, wherein the controller is configured to switch between the first mode and the second mode based on a displacement of the movable member.

12. The helicopter of claim 8, further comprising a sensor configured to measure a displacement of said movable member, wherein the controller is configured to switch between the first mode and the second mode based on the displacement of the movable member measured by the sensor.

13. The helicopter of claim 8, wherein said pump assembly comprises:

a coil configured to generate a magnetic field; and a giant-magnetostrictive element deformed based on the generated magnetic field, wherein a capacity of said pump chamber is changed through the deformation of said giant-magnetostrictive element, and wherein said controller controls said coil to change the capacity of said pump chamber.

14. A pump comprising:

a pump assembly including a pump chamber;

a valve section; and a controller configured to control said valve section to (i) open a first flow path connected with said pump chamber and close a second flow path connected said pump chamber, during a discharge period during which said pump chamber is pressurized, in a first mode;

(ii) close said first flow path and open said second flow path during an intake period during which said pump chamber is depressurized, in the first mode;

(iii) close said first flow path and open said second flow path during the discharge period in a second mode; and (iv) open said first flow path and close said second flow path during the intake period in the second mode, wherein said valve section has a plurality of positions set by said controller, and wherein the plurality of plurality of positions includes:

(i) a first position in which said valve section opens said first flow path and closes said second flow path;

(ii) a second position in which said valve section closes said first flow path and opens said second flow path; and (iii) a neutral position in which said valve section closes said first and second flow paths.

15. The pump of claim 14, wherein the controller is configured to switch between the first mode and the second mode based on a measured displacement of a movable member.

16. The pump of claim 14, wherein said pump assembly comprises:
   a coil configured to generate a magnetic field; and
   a giant-magnetostrictive element deformed based on the generated magnetic field,
   wherein a capacity of said pump chamber is changed through the deformation of said giant-magnetostrictive element.

17. A control method of an actuation system, the method comprising:
   providing an actuation system comprising a pump assembly including a pump chamber, an actuator having first and second chambers and a movable member and configured to convert pressures applied to said first and second chambers into a movement of said movable member, and a valve section;
   setting a first mode in which said valve section is controlled to open a first flow path between said pump and said first chamber and close a second flow path between said pump and said second chamber, during a discharge period during which said pump chamber is pressurized, and to close said first flow path and open said second flow path during an intake period during which said pump chamber is depressurized; and
   setting a second mode in which said valve section is controlled to close said first flow path and open said second flow path during the discharge period in a second mode, and to open said first flow path and close said second flow path during the intake period; and
   setting a neutral position between the first mode and the second mode.

18. The control method of claim 17, further comprising:
   switching between the first mode and the second mode based on a displacement of the movable member.

19. The control method of claim 17, wherein said pump assembly comprises:
   a coil configured to generate a magnetic field; and
   a giant-magnetostrictive element deformed based on the generated magnetic field,
   wherein a capacity of said pump chamber is changed through the deformation of said giant-magnetostrictive element, and
   wherein the method further comprises controlling the coil to change the capacity of said pump chamber.

* * * * *